United States Patent
Tsai et al.

(10) Patent No.: US 10,760,663 B2
(45) Date of Patent: Sep. 1, 2020

(54) METHOD OF MAKING STRAIN WAVE GEARING

(71) Applicant: HIWIN TECHNOLOGIES CORP., Taichung (TW)

(72) Inventors: Yi-Hung Tsai, Taichung (TW); Fung-Ling Nian, Taichung (TW); Jhe-Hong Wang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 624 days.

(21) Appl. No.: 15/681,706

(22) Filed: Aug. 21, 2017

(65) Prior Publication Data

US 2017/0343094 A1    Nov. 30, 2017

Related U.S. Application Data

(63) Continuation-in-part of application No. 14/471,862, filed on Aug. 28, 2014, now abandoned.

(30) Foreign Application Priority Data

Jun. 16, 2014 (TW) .............................. 103120761 A

(51) Int. Cl.
F16H 49/00 (2006.01)
(52) U.S. Cl.
CPC ..... F16H 49/001 (2013.01); *F16H 2049/003* (2013.01)
(58) Field of Classification Search
CPC .......................... F16H 49/001; F16H 2049/003
See application file for complete search history.

(56) References Cited

U.S. PATENT DOCUMENTS

| 4,227,092 A | * | 10/1980 | Campagnuolo | ........ H02K 7/116 290/1 C |
| 4,768,996 A | * | 9/1988 | Kumm | ..................... F16H 9/10 474/49 |

(Continued)

FOREIGN PATENT DOCUMENTS

| DE | 69406515 T2 | 3/1998 |
| DE | 102008060428 A1 | 6/2009 |

(Continued)

*Primary Examiner* — Howard J Sanders
*Assistant Examiner* — Gregory T Prather
(74) *Attorney, Agent, or Firm* — Muncy, Geissler, Olds & Lowe, P.C.

(57) ABSTRACT

A method of making a strain wave includes the steps of a) providing a circular spline, a flexspline meshed with the circular spline, and an initial wave generator having an initial outer profile of a standard ellipse with a perimeter $S_0$, and b) producing a modified wave generator rotatably fitted within the flexspline and having a modified outer profile with a perimeter S. A difference $E_S$ between the perimeter S of the modified outer profile and the perimeter $S_0$ of the initial outer profile satisfies the equation $E_S = S - S_0 = 0.1$ m to 0.8 m, wherein m is the modulus of the flexspline. Through a special parameter design of the modified wave generator, the meshing ratio between the circular spline and the flexspline is increased, thereby improving the transmission accuracy and reducing the average load.

2 Claims, 2 Drawing Sheets

(56) References Cited

U.S. PATENT DOCUMENTS

| | | | |
|---|---|---|---|
| 9,416,861 B2* | 8/2016 | Ishikawa | F16H 49/001 |
| 9,534,681 B2* | 1/2017 | Ishikawa | F16H 55/0833 |
| 10,267,403 B2* | 4/2019 | Liang | F16H 49/001 |
| 10,371,240 B2* | 8/2019 | Rossberger | B62M 11/145 |
| 2015/0362056 A1* | 12/2015 | Tsai | F16H 49/001 |
| | | | 74/640 |
| 2016/0281833 A1* | 9/2016 | Tsai | F16H 49/001 |
| 2020/0040814 A1* | 2/2020 | Nagai | F01M 1/06 |

FOREIGN PATENT DOCUMENTS

| | | |
|---|---|---|
| JP | H11-351341 A | 12/1999 |
| JP | 4067037 B2 | 3/2008 |
| JP | 5256249 B2 | 8/2013 |
| KR | 10-2011-0112027 A | 10/2011 |

* cited by examiner

METHOD OF MAKING STRAIN WAVE GEARING

CROSS-REFERENCE TO RELATED APPLICATIONS

This application is a continuation-in-part of Application Ser. No. 14/471862 filed on 28 Aug. 2017, the entire content of which is incorporated herein by reference.

BACKGROUND OF THE INVENTION

1. Field of the Invention

The present invention relates to speed reducing gear technology, and more particularly, to a method of making a strain wave gearing that can achieve a high meshing ratio.

2. Description of the Related Art

Strain wave gearing is a high-ratio speed reducer. A conventional strain wave gearing generally comprises a rigid circular spline, a flexspline rotatably mounted within the circular spline, and a wave generator rotatably mounted within the flexspline, wherein the wave generator is an elliptical member. When the wave generator is driven to rotate by a power source, the flexspline will be pushed to defoiiii by the outer profile of the wave generator, causing the circular spline to mesh with the flexspline in the major axis of the wave generator and to be disengaged from the flexspline in the minor axis of the wave generator. Due to a difference in the number of teeth between the circular spline and the flexspline, a high speed reduction ratio will be achieved to provide a high torque output after the wave generator is been continuously rotated.

Thus, the higher the meshing ration between the circular spline and the flexspline is, the better the overall transmission accuracy and the lower the average load of the teeth will be. However, the meshing ratio between the circular spline and the flexspline depends on the change in curvature between the major axis and minor axis of the wave generator. In order to optimize the change in curvature between the major axis and minor axis of the wave generator, Japanese Patent Nos. 4067037 and 5256249 disclose a measure of modifying the curvatures of the major axis and minor axis of a wave generator. However, the modification equation used in the aforesaid prior art patents is complicated, further, the effect of the modification is not as good as expected.

SUMMARY OF THE INVENTION

The present invention has been accomplished under the circumstances in view. It is the main objective of the present invention to provide a method of making a strain wave gearing, which designs a wave generator by simple steps to achieve the effects of improving the meshing ratio and transmission precision and reducing the average load of the teeth.

To achieve this and other objectives of the present invention, the present invention provides a method of making a strain wave gearing, comprising the steps of a) providing a circular spline having an inner annular toothed portion, a flexspline, which is rotatably mounted within the circular spline and provided with an outer annular toothed portion that is meshed with the inner annular toothed portion of the circular spline, and an initial wave generator, which is capable of being rotatably fitted within the flexspline and has an initial elliptical outer profile capable of being abutted against an inner profile of the flexspline, and b) producing a modified wave generator, which is rotatably fitted within the flexspline and has a modified elliptical outer profile derived from the initial elliptical outer profile and abutted against the inner profile of the flexspline. The initial elliptical outer profile has a perimeter $S_0$ satisfying the equation $$S_0 = \int_0^{2\pi} \sqrt{\partial_\theta (r_0)^2 + r_0^2} \,,$$

wherein $r_0$ is a radius of curvature of the initial elliptical outer profile and satisfies the equation $r_0 = \sqrt{(a\sin\theta)^2 + (b\cos\theta)^2}$, $0 \leq \theta \leq 2\pi$; a is a semi-major axis of the initial elliptical outer profile; b is a semi-minor axis of the initial elliptical outer profile; and $\theta$ is an eccentric angle of the initial elliptical outer profile. The modified elliptical outer profile has a perimeter $S$ satisfying the equation $$S = \int_0^{2\pi} \sqrt{\partial_\theta (r)^2 + r^2} \,,$$

wherein r is a radius of curvature of the modified elliptical outer profile and satisfies the equation $r = \sqrt{x^2 + y^2}$; x satisfies the equation $x = \{a' + C_a(\sin(4\theta' - (\pi/2)) + 1)\} \sin \theta'$, $0 \leq \theta' \leq 2\pi$; y satisfies the equation $y = \{b' + C_b(\sin(4\theta' - (\pi/2)) + 1)\} \cos \theta'$, $0 \leq \theta' \leq 2\pi$; a' is a semi-major axis of the modified elliptical outer profile, which is equal to the semi-major axis of the initial elliptical outer profile; b' is a semi-minor axis of the modified elliptical outer profile, which is equal to the semi-minor axis of the initial elliptical outer profile; $\theta'$ is an eccentric angle of the modified elliptical outer profile; $C_a$ is a semi-major modification factor; $C_b$ is a semi-minor modification factor; and $C_a$ and $C_b$ range from $-0.2$ m to $0.2$ m, respectively, wherein m is a modulus of the flexspline. A difference $E_S$ between the perimeter $S$ of the modified elliptical outer profile and the perimeter $S_0$ of the initial elliptical outer profile satisfies the equation $E_S = S - S_0 = 0.1$ m to $0.8$ m, wherein m is the modulus of the flexspline.

With the above-mentioned method, a desired, new wave generator, i.e. the modified wave generator, can be easily made by modifying an existing, conventional wave generator or a virtual wave generator that is compatible with or capable of being fitted with a conventional flexspline that is meshed with a conventional circular spline. With the wave generator having a modified outer profile produced by the present invention, during the operation of the wave generator to rotate the flexspline relative to the circular spline, the number of teeth of mesh between the outer annular toothed portion of the flexspline and the inner annular toothed portion of the circular spline is increased to achieve a high meshing ratio and a high level of transmission accuracy of the whole structure and to reduce the average load of the teeth.

Other advantages and features of the present invention will be fully understood by reference to the following specification in conjunction with the accompanying drawings, in which like reference signs denote like components of structure.

DETAILED DESCRIPTION OF THE INVENTION

Figure 1:
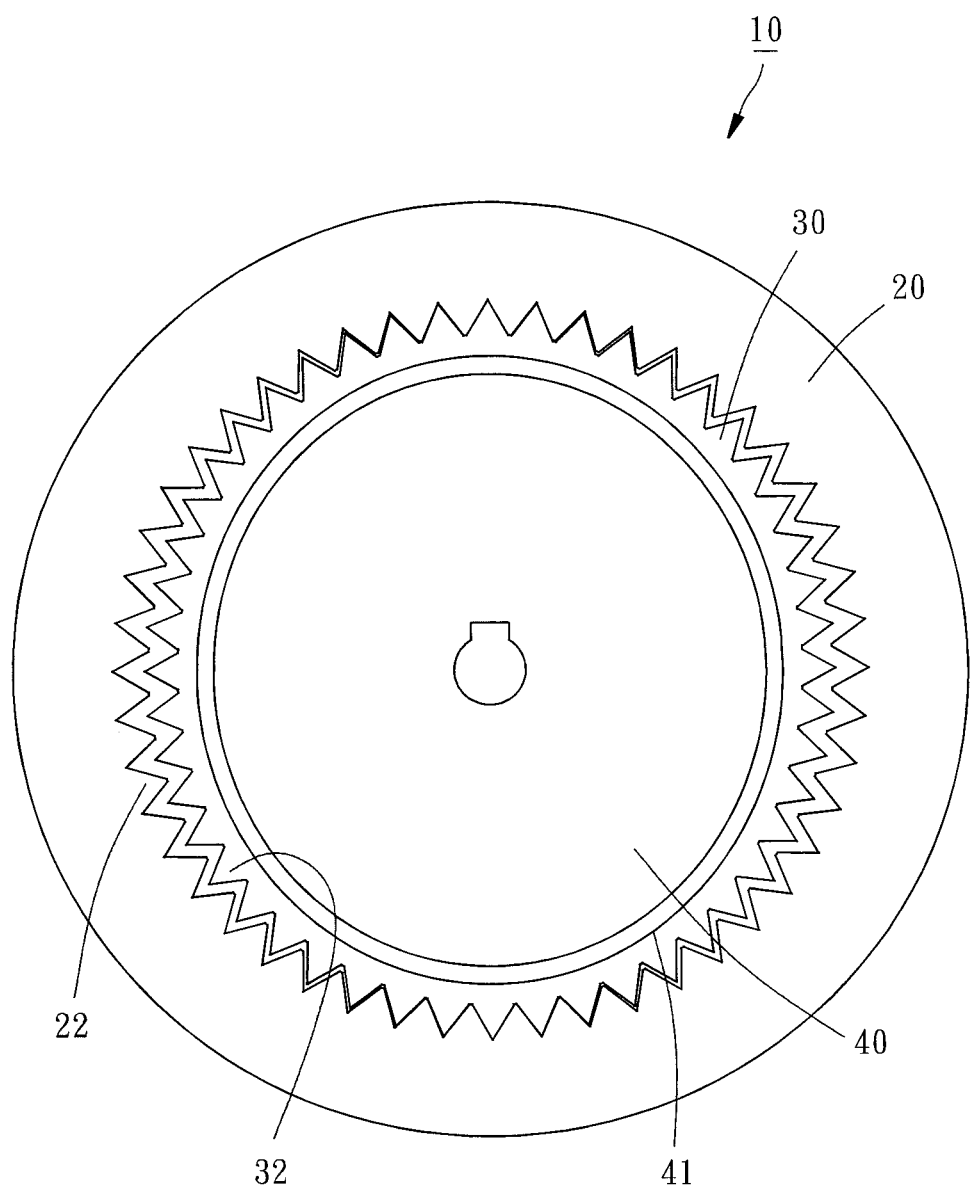
FIG. 1 is a schematic structural view of a strain wave gearing comprising a circular spline, a flexspline and an initial wave generator in accordance with the present invention.
Figure 2:
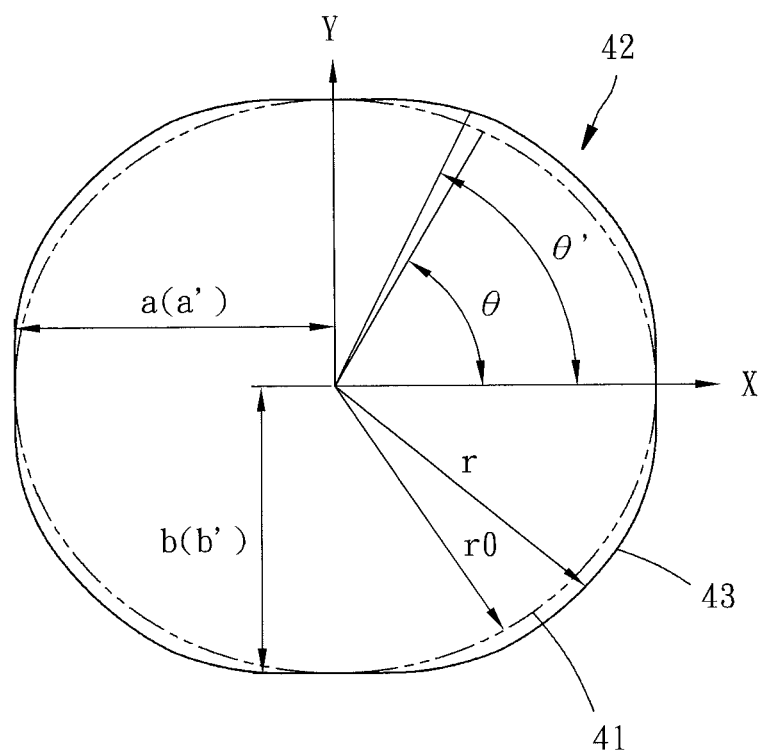
FIG. 2 is a schematic drawing illustrating outer profiles of the initial wave generator and a modified wave generator in accordance with the present invention, in which the dash line indicates the outer profile of the initial wave generator, and the solid line indicates the outer profile of the modified wave generator derived from the outer profile of the initial wave generator.

Referring to FIGS. 1 and 2, a method of making a strain wave gearing provided by an embodiment of the present invention comprised the following steps.

a) Provide a strain wave gearing 10 composed of a rigid circular spline 20, a flexspline 30, and an initial wave generator 40, as shown in FIG. 1. For the strain wave gearing 10, an existing, commercially available strain wave gearing may be used.

Specifically, the circular spline 20 has an inner annular toothed portion 22. The flexspline 30 is rotatably mounted within the circular spline 20 and provided with an outer annular toothed portion 32 meshed with the inner annular toothed portion 22 of the circular spline 20. It is to be noted that the number of teeth of the inner annular toothed portion 22 of the circular spline 20 is two or more times of the number of teeth of the outer annular toothed portion 32 of the flexspline 30. Further, the circular spline 20 and the flexspline 30 have a same modulus. The modulus used in this invention is defined as the quotient obtained by dividing the gear pitch diameter by the number of teeth.

For the initial wave generator, a physical, commercially available wave generator or a virtual wave generator may be used. As shown in FIG. 1, the initial wave generator 40 is rotatably fitted within the flexspline 30 and has an outer profile 41 of a standard ellipse. The initial elliptical outer profile 41 of the initial wave generator 40 is abutted against an inner profile of the flexspline 30. As a result, when the wave generator 40 is driven to rotate by a power source (not shown), the flexspline 30 will be pushed and deformed by the outer profile 41 of the wave generator 40, causing the inner annular toothed portion 22 of the circular spline 20 to be completely meshed with the outer annular toothed portion 32 of the flexspline 30 in the major axis direction of the wave generator 40 and completely disengaged from the outer annular toothed portion 32 of the flexspline 30 in the minor axis direction of the wave generator 40. Thus, the circular spline 20 can be rotated by the flexspline 30 to achieve the effect of torque output.

The initial elliptical outer profile 41 of the initial wave generator 40 has a perimeter $S_0$ satisfying the equation $$S_0 = \int_0^{2\pi} \sqrt{\partial_\theta(r_0)^2 + r_0^2} \; ,$$

wherein:

$r_0$ is a radius of curvature of the initial elliptical outer profile 41 and satisfies the equation $r_0 = \sqrt{(a\sin\theta)^2 + (b\cos\theta)^2}$, $0 \leq \theta \leq 2\pi$;

a is a semi-major axis of the initial elliptical outer profile 41 of the initial wave generator 40;

b is a semi-minor axis of the initial elliptical outer profile 41 of the initial wave generator 40; and θ is an eccentric angle of the initial elliptical outer profile 41 of the initial wave generator 40.

b) Produce a modified wave generator 42 by modifying the initial wave generator 40 and mount the modified wave generator 42 inside the flexspline 30 in lieu of the initial wave generator 40, so as to complete the strain wave gearing 10 of the present invention.

Specifically, the modified wave generator 42 is configured having a modified elliptical outer profile 43, which is derived from the initial elliptical outer profile 41 of the initial wave generator 40 and is abutted against the inner profile of the flexspline 30 when the modified wave generator 42 is rotatably fitted within the flexspline 30. The modified elliptical outer profile 43 is configured having a perimeter S satisfying the equation $$S = \int_0^{2\pi} \sqrt{\partial_\theta(r)^2 + r^2} \; ;$$

wherein:

r is a radius of curvature of the modified outer profile 43 of the modified wave generator 42 and satisfies the equation $r = \sqrt{x^2 + y^2}$;

x satisfies the equation $x = \{a' + C_a(\sin(4\theta' - (\pi/2)) + 1)\}\sin\theta'$, $0 \leq \theta' \leq 2\pi$;

y satisfies the equation $y = \{b' + C_b(\sin(4\theta' - (\pi/2)) + 1)\}\sin\theta'$, $0 \leq \theta' \leq 2\pi$;

a' is a semi-major axis of the modified elliptical outer profile 43 of the modified wave generator 42, which is equal to the semi-major axis of the initial elliptical outer profile 41 of the initial wave generator 40;

b' is a semi-minor axis of the modified elliptical outer profile 43 of the modified wave generator 42, which is equal to the semi-minor axis of the initial elliptical outer profile 41 of the initial wave generator 40;

θ' is an eccentric angle of the modified elliptical outer profile 43 of the modified wave generator 42;

$C_a$ is a semi-major modification factor, $C_b$ is a semi-minor modification factor, and $C_a$ and $C_b$ range from −0.2 m to 0.2 m, respectively, wherein m is a modulus of the flexspline.

Further, the modified wave generator 42 is configured in a way that a difference $E_S$ between the perimeter S of the modified elliptical outer profile 43 and the perimeter $S_0$ of the initial elliptical outer profile 41 satisfies the equation $E_S = S - S_0 = 0.1$ m to 0.8 m, wherein m is the modulus of the flexspline 30.

With the wave generator 42, which has the elliptical outer profile 43 modified from the initial elliptical outer profile 42 of an initial wave generator 40 and is installed inside the flexspline 30, during the operation of the wave generator 42 to rotate the flexspline 30 relative to the circular spline 20, engaging and disengaging frequency between the outer annular toothed portion 32 of the flexspline 30 and the inner annular toothed portion 22 of the circular spline 20 is increased, thereby increasing the number of teeth in mesh, and thus, the strain wave gearing 10 provided by the present invention can achieve a high meshing ratio and a high level of transmission accuracy and can also reduce the average load of the teeth.

What is claimed is:

1. A method of making a strain wave gearing, comprising the steps of:
   a) providing a circular spline having an inner annular toothed portion, a flexspline rotatably mounted within the circular spline and provided with an outer annular toothed portion meshed with the inner annular toothed portion of the circular spline, and an initial wave generator capable of being rotatably fitted within the flexspline, the initial wave generator having an initial elliptical outer profile capable of being abutted against an inner profile of the flexspline, the initial elliptical outer profile having a perimeter $S_0$ satisfying the equation $$S_0 = \int_0^{2\pi} \sqrt{\partial_\theta (r_0)^2 + r_0^2} \, ,$$

wherein:

$r_0$ is a radius of curvature of the initial elliptical outer profile and satisfies the equation $r_0 = \sqrt{(a\sin\theta)^2 + (b\cos\theta)^2}$, $0 \leq \theta \leq 2\theta$;

a is a semi-major axis of the initial elliptical outer profile;

b is a semi-minor axis of the initial elliptical outer profile; and

θ is an eccentric angle of the initial elliptical outer profile; and b) producing a modified wave generator rotatably fitted within the flexspline, the modified wave generator having a modified elliptical outer profile derived from the initial elliptical outer profile and abutted against the inner profile of the flexspline, the modified elliptical outer profile having a perimeter S satisfying the equation $$S = \int_0^{2\pi} \sqrt{\partial_\theta (r)^2 + r^2} \, ;$$

wherein r is a radius of curvature of the modified elliptical outer profile and satisfies the equation $r = \sqrt{x^2 + y^2}$;

x satisfies the equation $x = \{a' + C_a(\sin(4\theta' - (\pi/2)) + 1)\}\sin\theta'$, $0 \leq \theta' \leq 2\pi$;

y satisfies the euqation $y = \{b' + C_b(\sin(4\theta' - (\pi/2)) + 1)\}\cos\theta'$, $0 \leq \theta' \leq 2\pi$;

a' is a semi-major axis of the modified elliptical outer profile, which is equal to the semi-major axis of the initial elliptical outer profile;

b' is a semi-minor axis of the modified elliptical outer profile, which is equal to the semi-minor axis of the initial elliptical outer profile;

θ is an eccentric angle of the modified elliptical outer profile;

$C_a$ is a semi-major modification factor;

$C_b$ is a semi-minor modification factor; and $C_a$ and $C_b$ range from −0.2 m to 0.2 m, respectively, wherein m is a modulus of the flexspline;

wherein a difference $E_S$ between the perimeter S of the modified elliptical outer profile and the perimeter $S_0$ of the initial elliptical outer profile satisfies the equation $E_S = S - S_0 = 0.1$ m to 0.8 m, wherein m is the modulus of the flexspline.

2. The method as claimed in claiml, wherein the circular spline and the flexspline have a same modulus.

* * * * *